(No Model.)
F. A. DELAND.
ATTACHMENT FOR LAWN MOWERS.
No. 404,691. Patented June 4, 1889.
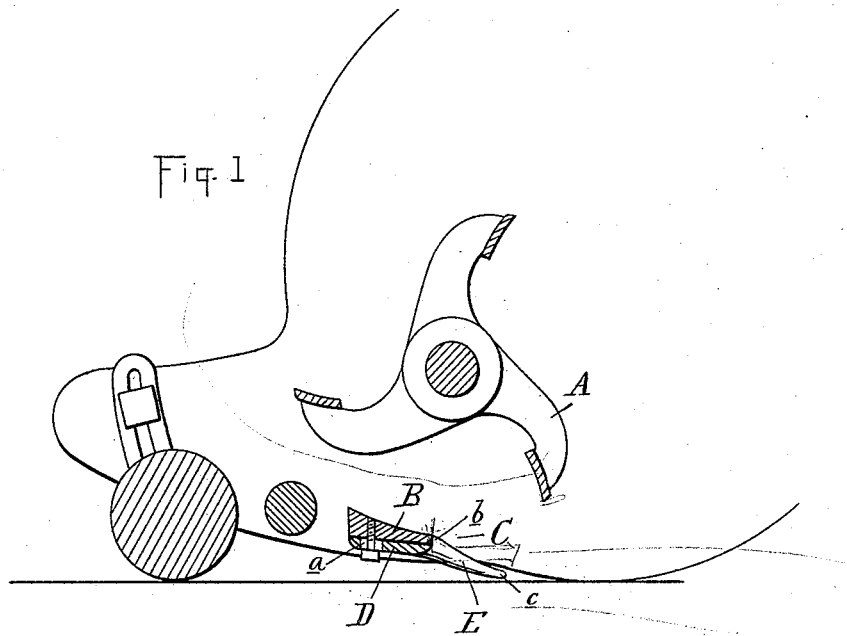
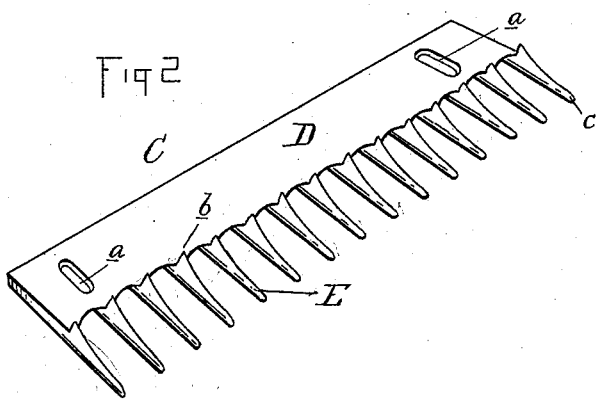
Witnesses:
P. M. Hulbert
J. Paul Mayer
Inventor:
Frank A. Deland
By Thos. S. Sprague & Son
Att'y.

UNITED STATES PATENT OFFICE.

FRANK A. DELAND, OF MEMPHIS, MICHIGAN.

ATTACHMENT FOR LAWN-MOWERS.

SPECIFICATION forming part of Letters Patent No. 404,691, dated June 4, 1889.

Application filed October 3, 1888. Serial No. 287,057. (No model.)

*To all whom it may concern:*

Be it known that I, FRANK A. DELAND, a citizen of the United States, residing at Memphis, in the county of Macomb and State of Michigan, have invented certain new and useful Improvements in Lawn-Mowers, of which the following is a specification, reference being had therein to the accompanying drawings.

This invention relates to a new and useful improvement in lawn-mowers; and the object of the invention is to provide a lawn-mower with a suitable device for picking up leaves, dry grass, and creeping plants or stems of grass, which ordinarily escape the action of the lawn-mower and render a lawn not only difficult to mow, but prevent its being placed in the perfect condition which lovers of fine lawns desire to obtain.

To this end my invention consists in a peculiarly-constructed metallic comb which may be readily secured to any lawn-mower, and which travels in advance of the stationary knife-bar close to the ground, and is adapted to pick up all low-growing plants or weeds and débris—such as leaves, fruit fallen off the trees, &c.—and present them to the rotating knives and knife-bar, from which they may be carried into a receptacle or so-called "grass-collector" attached to the rear end of the lawn-mower, and which I prefer to use as an adjunct to my device also. It is not necessary to introduce and describe it here in connection with my invention, as such devices are well known and used.

In the drawings which accompany this specification, Figure 1 is a vertical central section through a lawn-mower of known construction and provided with my improvement, and Fig. 2 is a detached perspective view of my attachment or comb.

A is the rotary knife of the lawn-mower. B is the stationary knife-bar thereof, and C is my attachment or comb. This I construct integrally in one piece of varying width to suit the different sizes of lawn-mowers, and it consists of the flat body D, of suitable shape to fit against the under side of the stationary knife-bar, and provided with two or more slots $a$, by means of which it may be adjustably secured to the stationary knife-bar of the mower by suitable clips or bolts.

E are the teeth of the comb, projecting forwardly from the body, where they form shoulders $b$, which fit against the forward edge of the knife-bar, and more or less downwardly, tapering off gradually to a point $c$, and these teeth are spaced at an equal distance apart in such close proximity to each other as the nature of the work requires. The top of the teeth have to form an unbroken ascent or incline from the point of the teeth toward the top of the stationary knife-bar, so that everything is carried directly and easily without catching on the stationary knife-bar into the path of the rotating knives. I preferably secure the comb detachably to the stationary knife-bar by means of a clamp or bolts or otherwise, as it will be often necessary to dispense with the use of the comb in order to cut close to the edge of a lawn or border, which, however, can be avoided by running the lawn-mower in suitable direction, as well known by those experienced in the use of lawn-mowers, and therefore my device may also be used as a permanent attachment to lawn-mowers.

What I claim as my invention is—

In a lawn-mower, the combination, with the stationary knife-bar thereof, of a comb integrally cast in one piece, provided with a flat body D, having suitable means of attachment to said knife-bar, and provided with the tapering and forwardly-projecting teeth E, the upper faces of which are flush with the upper surface of the knife-bar at their rear ends, forming shoulders $b$, and inclined downwardly and forwardly therefrom, substantially as described.

In testimony whereof I affix my signature, in presence of two witnesses, this 26th day of September, 1888.

FRANK A. DELAND.

Witnesses:
JOHN SCHUMAN,
P. M. HULBERT.